(12) United States Patent
Froehling et al.

(10) Patent No.: US 6,232,378 B1
(45) Date of Patent: May 15, 2001

(54) PROCESS FOR INCORPORATING AN ACTIVE SUBSTANCE IN A MOULDED PLASTIC PART

(75) Inventors: Peter E. Froehling, Sittard; Ellen M. M. de Brabander-van den Berg, Schinnen; Hubertus A. M. Mostert, Geleen, all of (NL)

(73) Assignee: DSM N.V., Heerlen (NL)

( * ) Notice: Subject to any disclaimer, the term of this patent is extended or adjusted under 35 U.S.C. 154(b) by 0 days.

(21) Appl. No.: 09/275,140

(22) Filed: Mar. 23, 1999

Related U.S. Application Data

(63) Continuation of application No. PCT/NL97/00527, filed on Sep. 22, 1997.

(30) Foreign Application Priority Data

Sep. 23, 1996 (NL) .................................................. 1004094

(51) Int. Cl.$^7$ ..................................................... C08K 5/23
(52) U.S. Cl. ............................................................. 524/190
(58) Field of Search ................................................ 524/190

(56) References Cited

U.S. PATENT DOCUMENTS

| | | |
|---|---|---|
| 3,361,843 | 1/1968 | Miller et al. . |
| 4,631,337 | 12/1986 | Tomalia et al. ....................... 528/391 |
| 5,527,524 | 6/1996 | Tomalia et al. ...................... 424/1.33 |
| 5,530,092 | 6/1996 | Meijer et al. ......................... 528/363 |

FOREIGN PATENT DOCUMENTS

| | | |
|---|---|---|
| 672 703 | 9/1995 | (EP) . |
| 960 798 | 6/1964 | (GB) . |
| 95/02008 | 1/1995 | (WO) . |

OTHER PUBLICATIONS

Gupta et al: "Dyeable Polypropylene Composition", Review of Progress in Coloration & Related Topics, vol. 19, Jan. 1, 1989, pp. 7–19, XP000105445, see p. 9, paragraph 2.3–p.17.

*Primary Examiner*—Kriellion Sanders
(74) *Attorney, Agent, or Firm*—Pillsbury Madison & Sutro Intellectual Property Group

(57) ABSTRACT

The invention provides a process for incorporating an active substance in an object comprised partly or entirely of plastic which contains a dendrimer.

15 Claims, No Drawings

PROCESS FOR INCORPORATING AN ACTIVE SUBSTANCE IN A MOULDED PLASTIC PART

This is a Continuation of: International Appln. No. PCT/NL97/00527 filed Sep. 22, 1997 which designated the U.S.

FIELD OF THE INVENTION

The invention relates to a process for incorporating an active substance in an object partly or entirely consisting of plastic, by bringing the object into contact with the active substance.

BACKGROUND OF THE INVENTION

Such a process is known from Kirk Othmer, Encyclopedia of Chemical Technology, Vol. 8 (1993), pp. 672–753. Described herein is the dying of plastic fibres in a bath containing a solution of a dye, in which the dye, in this case the active substance, penetrates the fibre.

A drawback of the known process is that the active substance is with difficulty absorbed into the plastic. It is for example not really possible to dye polypropylene fibres because the dye does not, or only with great difficulty, penetrates the polypropylene fibre.

The aim of the invention is to provide a process that does not possess the aforementioned drawback.

SUMMARY AND OBJECTS OF THE INVENTION

Surprisingly, it has now been found that the active substance is very well absorbed if the plastic of the object contains a dendrimer with terminal groups that are compatible with the plastic.

A further advantage is that new combinations of active substances and plastics have become possible, because active substances that are not absorbed into the plastic itself are absorbed into the plastic containing the dendrimer.

The invention creates new, surprising possibilities. It is for example possible for a highly effective active substance that cannot endure the processing of the plastic into the object—for example because the active substance degrades at the temperatures prevailing during the processing—to be incorporated in the plastic after the processing.

DETAILED DESCRIPTION OF THE INVENTION

In the context of the invention 'dendrimers' are understood to be three-dimensional, highly branched oligomeric or polymeric molecules. The dendrimers according to the invention may contain a nucleus, a number of generations of branches and terminal groups. A generation of branches consists of structural units ABx, in which x>or=2, which are radially bound to the nucleus or to the structural units of the previous generation and extend outwards. A subsequent generation may form because for example groups A react with groups B of the previous generation.

The structural units may either be the same with each subsequent generation (repeat themselves) or they may differ. Dendrimers can be characterised by a degree of branching. The 'degree of branching' of a dendrimer of a particular generation is here understood to be the ratio of the number of branches present and the maximum possible number of branches in a completely branched dendrimer of the same generation.

The branches may occur with varying degrees of regularity. The branches at the outside surface of the dendrimers used in the context of the invention may for example all be of the same generation, but they may also be of different generations. The latter may for example be the case if the synthesis of the dendrimers proceeds in a less controlled manner.

'Dendrimers' are according to the invention understood to be completely branched dendrimers, dendrimers with defects in their branched structure, dendrimers with an incomplete degree of branching, asymmetrically branched dendrimers, star polymers, highly branched polymers, highly branched copolymers and/or block copolymers of highly branched and non-highly branched polymers. Preferably the degree of branching is at least 50%, even more preferably at least 75%.

Preferably use is made of completely branched dendrimers, dendrimers with defects in their branched structure, dendrimers with an incomplete degree of branching, or asymmetrically branched dendrimers.

Because of the dendrimer's three-dimensional structure, there are cavities between the branches. The shape and the dimensions of these cavities vary in accordance with the generation, the chemical composition of the structural units and the degree of branching. It is possible to influence the degree of branching and the shape and dimensions of the cavities between the branches during the preparation of the dendrimer. This can be achieved among other ways by varying, for example the chemical composition, the structural units' molecular weight, by increasing or decreasing the degree of branching or by disturbing the regularity in the branches' composition.

It is possible to influence the degree in which and rate at which the active substance is absorbed into the moulded part by varying the cavities' shape and dimensions The dendrimers' terminal groups consist of the non-reacted groups B of the structural units ABx. The terminal groups B may themselves be compatible with the plastic of the moulded part that is brought into contact with the active substance. If the terminal groups B are themselves not, or insufficiently, compatible with the plastic, the terminal groups B can be modified with the aid of a modifying compound to yield modified terminal groups that are compatible with the plastic.

The fact that the terminal groups are compatible with the plastic means that the dendrimer can be well dispersed in the plastic.

If the plastic of the moulded part is non-polar, a compound that is also non-polar is used as the modifying compound. If the plastic is polar, a compound that is also polar is used.

The type of modifying compound to be used will to a great extent depend on the modifying compound's reactivity with respect to the dendrimer's terminal group B. Preferably a compound is chosen that reacts as completely as possible with the dendrimer's terminal group.

Modifying compounds suitable for appending non-polar groups to the dendrimer's terminal groups are for example aliphatic halogenides, aliphatic alcohols, phenols, aliphatic and aromatic carboxylic acids, fatty acids, esters of aliphatic carboxylic acids and aromatic or aliphatic alcohols, esters of aromatic carboxylic acids and aromatic or aliphatic alcohols, aliphatic or aromatic epoxides, aliphatic or aromatic isocyanates, aliphatic or aromatic amides, aliphatic or aromatic amines, completely or incompletely fluorinated aliphatic compounds, sulphonic acids and derivatives of sulphonic acids, compounds containing phosphorus or compounds containing silicon. Mixtures of such compounds are also suitable. Preferably a compound that modifies the terminal group with an alkyl group is used as a non-polar compound, because this generally results in a very good compatibility with non-polar plastics, such as polyolefines. Examples of modifying compounds that modify the terminal groups with an alkyl group are fatty acids, alcohols derived from a fatty acid, amines derived from a fatty acid, isocyanates corresponding to a fatty acid, epoxides corresponding to a fatty acid and halogenides corresponding to a fatty acid. Examples are stearyl alcohol, dodecyl phenol, 4,4,5,5,5-pentafluoro-n-pentanol-1, stearamide, palmityl isocyanate, palmitoyl chloride, stearyl chloride, pentafluoropropionyl chloride, lauric acid, myristic acid, palmitic acid, stearic acid, perfluorononanoic acid and the mixture of alkane carboxylic acids known as "Montanwachs". More preferably use is made of a saturated or (mono- or poly) unsaturated fatty acid.

Preferably use is made of a modifying compound that modifies the terminal group with an alkyl group having 6–50 C atoms, more preferably with an alkyl group having 12–30 atoms, even more preferably with an alkyl group having 16–20 atoms.

Other compounds suitable for modifying the terminal groups with non-polar groups are oligomer and/or polymer chains that are compatible with the plastic matrix into which the dendrimer must be mixed.

Compounds suitable for modifying the dendrimer's terminal groups with polar groups are for example polyacrylates, polymethacrylates, polyvinyl alcohols, polyvinyl esters, polyvinyl ethers, polyurethanes, polyurea, polyisocyanates, polyvinyl pyridines, polyvinyl pyrrolidones, polyethylene glycols, polyethylene imines, polycarbonates, polycaprolactones, nylons, styrene-acrylonitrile copolymers (SAN), styrene-maleic anhydride copolymers (SMA), polyphenylene oxides (PPO), Jeff amines, telechelic polyesters, copolymers of alkenes with carbon monoxide, copolymers of styrene, polymers of acrylic acid and polymers of methacrylic acid.

Preferably use is made of dendrimers of which at least 30% of the terminal groups has reacted with a modifying compound, more preferably 40–75% of the terminal groups has reacted with a modifying compound. This ensures that the dendrimer is well miscible in the plastic of the object and that the active substance is rapidly absorbed.

Regularly composed dendrimers can be prepared via a divergent process, according to which successive generations of dendrimer molecules are generated in repeated reaction sequences starting from a multifunctional nucleus, the branches being generated in a systematic manner. Such a process is for example described in EF-A-575 596. It is also possible to first synthesize regularly branched segments via a convergent process and to couple them to a multifunctional nucleus in a last step. It is furthermore possible to use combinations of convergent and divergent processes.

Less regularly composed dendrimers can for example be prepared via polycondensation, ring-opening polymerisation or addition polymerisation.

Highly branched polymers can be prepared for example via radical or anionic or cationic chain polymerisation of monomers of type AB, where A is a vinyl group and B a group that is activated via an initiation commonly used for chain polymerisation. Such a polymerisation is for example described in J. M. J. Fréchet, Science 269 (1995), pp. 1080–1083.

It is also possible to prepare a highly branched polymer through cationic polymerisation of ethylene imine. The resultant highly branched polymer has many reactive functional terminal groups.

Dendrimers that are suitable in the context of the invention are dendrimers based on for example a polyester, polyether, polythioether, polyamide, polyether ketone, polyalkylene imine, polyamidoamine, polyether amide, polyarylene, polyalkane, polyalkylene aromatic compounds, polyarylacetylene and/or a dendrimer containing phosphorus or silicon, or a combination thereof. Preferably use is made of a dendrimer based on polyalkylene imine or polyamidoamine. It is also possible to use a highly branched polyester.

When use is made of the dendrimers according to the invention with which generations of branches are demonstrable, use is preferably made of dendrimers of the 2nd up to and including the 5th, more preferably the 3rd or the 4th, generation.

Active substances that can be used in the process according to the invention are for example antistatic agents, adhesives, odorous substances, fireproofing agents, flame retardants, antioxidants, UV-stabilisers and dyes. Preferably use is made of dyes.

To speed up the incorporation of the active substance a low molecular compound that swells the plastic can be used.

Examples of suitable types of dyes are azo, azine, perinone, anthraquinone, xanthene, phthalocyanine, triarylmethane, indophenol, coumarin and diazomethane dyes. Mixtures of dyes are also suitable. Criteria in the selection of the dye are for example the desired colour and the pigment's thermal and UV resistance.

By using the process according to the invention the active substances can be incorporated in objects of many kinds of plastics. Thermoplastics, thermosetting plastics as well as rubbers are suitable. The invention is suitable for both homo- and copolymers. Mixtures of plastics can also be used. Examples of suitable plastics are polyolefins, such as low-density polyethylene (LDPE), high-density polyethylene (HDPE), vLDPE, LLDPE, polypropylene (PP), which is understood to include PP homopolymers and PP copolymers such as random ethylene/propylene copolymers and PP block copolymers with an ethylene/propylene phase, vinyl polymers, styrene polymers, acrylic polymers, fluorine-containing polymers, polyamides, polycarbonates, polyoxyalkylenes, polyimides, polybenzimidazoles, polyphenylene oxides, polyacrylonitriles, polyesters, phenol-formaldehydes, aminoplastics, epoxy resins, polyurethanes, styrene-butadiene rubber, butyl rubber, chlorobutyl rubber, chloroprene rubber, nitrile rubber, butadiene rubber, isoprene rubber, ethylene-propylene rubbers (EPM, ethylene-propylene monomer, and EPDM, ethylene-propylene-diene monomer), silicone rubbers, urethane rubbers, acrylate rubbers, fluorine-containing rubbers and/or cyclopentene rubbers.

In the process according to the invention the object can in several ways be brought into contact with the active substance. It is, for example possible to immerse the object or coat it with a liquid active substance or to treat the object in this manner with a solution, a melt, a slurry or an emulsion of an active substance. It is also conceivable that an object is brought into contact with a gaseous active substance or with an active substance in the solid phase.

In a preferred embodiment the invention relates to a process in which a polyolefins, more preferably polypropylene, is used as the plastic of the object. By preference the plastic of these objects comprises polypropylene imine dendrimers. By preference the dendrimer contains non-polar fatty acid end groups.

Such object can very well be printed with the aid of the process according to the invention, without having to subject the surface of the object to a special treatment, such as a corona treatment. Such objects can also very well be dyed, by immersing them in a bath containing a solution of a dye. In this way objects of a polyolefin with very deep, intense colours can be obtained, whereas this is not achievable, or achievable with great difficulty, with the known processes.

The advantages of the invention become particularly evident if the process according to the invention is used in dying fibres, in particular polypropylene fibres.

In particular, dying fibres, especially polypropylene fibres, according to the known processes involves problems, in connection with the poor absorption of the dye into the fibres. It is not possible to modify the fibres' surface to improve the absorption of dye, such as etching the fibre surface, because these modifications of the fibres generally adversely affect the fibres' mechanical properties, such as tensile strength and stiffness.

Fibres that have been dyed with the aid of the process according to the invention can have bright, deep colours and there are no problems with the fibres' mechanical properties.

By preference for dying the fibers a polar dye that cannot dissolve in water is used. Examples of such dyes are the disperse dyes. In this way fibers have a high washing resistance are obtained.

The invention will be elucidated with reference to the examples, without being restricted thereto.

In the following examples use is made of polypropylene imine dendrimers. The preparation of such dendrimers is described in EP-A-575 596 and EP-A-707 611. Amine-terminated polypropylene imine dendrimers according to the aforementioned applications have 16 amine terminal groups in the third generation and 32 amine terminal groups in the fourth generation.

EXAMPLE I 4.84 grams of an amine-terminated polypropylene imine dendrimer of the fourth generation (corresponding to 44.0 milliequivalents of $NH_2$), 12.50 grams of stearic acid (corresponding to 43.9 milliequivalents) and 20 ml of xylene were stirred and heated to 180° C. for half an hour in a triple-neck flask with a volume of 250 ml. The triple-neck flask was fitted with a Dean-Stark set-up with a reflux cooler. Next, the xylene solution was poured into 250 ml of methanol while it was still hot, which resulted in the formation of a precipitate. The precipitate was removed through filtration, washed with methanol and dried in a vacuum at 45° C. The yield was 12.8 grams of a yellowish white powder. Infrared and nuclear spin resonance spectra showed that all the amine groups of the dendrimer had been converted into amide by the stearic acid. The dendrimer modified with stearic acid had a melting point of 82–83° C.

In a mini-extrusion apparatus a mixture of 4.5 g of an isotactic polypropylene with a melt index of 20 g/10 min. (230° C., 2.16 kg) and the dendrimer was successively extruded in amounts of 1, 2 and 4 percent by weight. A thread was obtained via the extruder's drain opening, which was stretched via a rapidly rotating winding machine to obtain fibres with a thickness of about 70 micrometres.

EXAMPLE II 4.24 grams of an amine-terminated polypropylene imine dendrimer of the fourth generation (corresponding to 38.6 milliequivalents of $NH_2$) and 5.48 grams of stearic acid (corresponding to 19.3 milliequivalents, that is, half of the number of amine groups used) were heated to 150° C. for 1 hour, at a reduced pressure of 20 mm of mercury, in a 250-ml two-neck flask fitted with a distillation set-up with a cooler. After cooling a yellow-white solid substance had formed, which, as demonstrated by spectroscopic examination, no longer contained any free stearic acid and had a melting point of 74–76° C.

Polypropylene fibres were prepared as described in Example I.

EXAMPLE III 10.56 grams an amine-terminated polypropylene imine dendrimer of the third generation (corresponding to 100.2 milliequivalents of $NH_2$) and 28.44 grams of stearic acid (corresponding to 100.0 milliequivalents) were heated to 150° C. for 1 hour, at a reduced pressure of 20 mm of mercury, in a 250-ml two-neck flask fitted with a distillation set-up with a cooler. After cooling a yellow-white solid substance had formed, which no longer contained any free stearic acid. The product had a melting point of 81–82° C.

Polypropylene fibres were prepared as described in Example I.

EXAMPLE IV 14.19 grams of an amine-terminated polypropylene imine dendrimer of the third generation (corresponding to 134.6 milliequivalents of $NH_2$) and 19.11 grams of stearic acid (corresponding to 67.2 milliequivalents, that is, half of the number of amine groups used) were heated to 150° C. for 1 hour, at a reduced pressure of 20 mm of mercury, in a 250-ml two-neck flask fitted with a distillation set-up with a cooler. After cooling a yellow-white solid substance had formed, which no longer contained any free stearic acid.

Polypropylene fibres were prepared as described in Example I.

COMPARATIVE EXPERIMENT A

Polypropylene fibre without an added modified dendrimer was obtained through extrusion at 220° C. of the polypropylene used in Example I, otherwise as described in Example I.

EXAMPLE V

An acid dye bath containing the dye Tectilon Blue GC-G (Acid Blue 344) was prepared by dissolving 1 gram of this dye in a solution of 2.8 ml of concentrated sulphuric acid in 1 litre of water, which had a pH of about 1.6. Bundles of polypropylene fibres with a length of about 50 mm, prepared according to Examples I–IV and Comparative Experiment A, were placed in 10 ml of the dye solution. While the solution was stirred via a magnetic stirrer, it was heated to 80° C. in a water bath in approx. 30 minutes and kept at this temperature for two hours. Then the fibre bundle was removed from the dye solution and washed twice in running water of approx. 20° C. for about ten seconds. Next, the fibre bundle was dried to the air.

The amount of dye absorbed by the fibres was visually assessed. In this assessment the following designations were assigned:

0 colourless, the same as the starting material 1 slight colouring 2 moderate colouring 3 deep colouring
4 very deep colouring The results of the colour assessments of the different fibres are shown in Table 1.

TABLE 1

Assessment of the colour of fibres dyed with Tectilon Blue GC-G (Acid Blue 344)

| fibre according to | 1 wt. % | 2 wt. % | 4 wt. % |
|---|---|---|---|
| Example I | 1 | 2 | 2 |
| Example II | 2 | 3 | 4 |

Fibre according to Comparative Experiment A: 0.

This shows that the results obtained with the fibres prepared from the compositions according to the invention are considerably better than those obtained with fibres made of polypropylene without the added modified dendrimer. The best results are obtained with fibres prepared from the composition according to Example II, in which 50% of the terminal groups of the dendrimer is modified.

EXAMPLE VI

The process according to Example VI was repeated using the dye Tectilon Blue 4R-01 (Ciba-Geigy). The assessment of the colour of the resulting fibres is given in Table 2.

TABLE 2

Assessment of the colour of fibres dyed with Tectilon Blue 4R-01

| fibres according to | 1 wt. % | 2 wt. % | 4 wt. % |
|---|---|---|---|
| Example I | 1 | 2 | 2 |
| Example II | 1 | 3 | 4 |

Fibres according to Comparative Experiment A: 0.

Half of the deeply coloured fibre bundle containing 4% modified dendrimer according to Example II was placed in 10 ml of water of 40° C. for 2 hours, with stirring. After drying the visual assessment of the colouring was unchanged.

EXAMPLE VII

The process according to Example V was repeated with the dye Tectilon Red 2B (Ciba-Geigy). The visual assessment of the colouring is given in Table 3.

TABLE 3

Assessment of the colour ot fibres dyed with Tectilon Red 2B.

| fibre according to | 1 wt. % | 2 wt. % | 4 wt. % |
|---|---|---|---|
| Example I | 1 | 3 | 3 |
| Example II | 2 | 3 | 4 |

Fibre according to Comparative Experiment A: 0.

Half of the deeply coloured fibre bundle containing 4% additive according to Example II was placed in 10 ml of water of 40° C. for 2 hours, with stirring. After drying the visual assessment of the colouring was unchanged.

EXAMPLE VIII

The process according to Example V was repeated with the dye Tectilon Yellow 2G 200 and Erionyl Blue RL. The colouring of the fibres containing 2 and 4 percent by weight dendrimer according to Examples 2 up to and including 4 was very deep. A moderate to deep colouring was obtained already with 1% of the dendrimer. No loss of colour occurred in treatment with water of 40° C. as described in Example VIII of the deeply coloured fibres containing 4% dendrimer according to Example II.

EXAMPLE IX

An acid dye bath containing the dye Erionyl Red 2B was obtained by dissolving 1 gram of this dye in 1 liter of a solution of acetic acid in water with a pH of 3.1. Fibres were dyed in the manner described in Example VIII. The visual assessment of the colouring is given in Table 4. No loss of colour occurred in treatment with water of 40° C. as described in Example VI of the deeply coloured fibres containing 4% modified dendrimer according to Example II.

TABLE 4

Assessment of the colour of fibres dyed with Erionyl Red 2B in diluted acetic acid

| fibre according to | 1 wt. % | 2 wt. % | 4 wt. % |
|---|---|---|---|
| Example I | 2 | 3 | 3 |
| Example II | 2 | 3 | 4 |
| Example III | — | 2 | 3 |
| Example IV | — | 4 | 4 |

Fibre according to Comparative Experiment A: 1.

EXAMPLE X

A disperse dye bath was prepared by dispersing 1 gram of the dye Terasil Blue 3RL-02 in 1 liter water. Polypropylene fibers prepared according to examples II en IV were dyed in this bath, according to the process as further described in example V.

The colouring of the fibers, comprising 2 wt. % of dendrimer, was very deep.

The washing resistance was determined by treating a bundle of 10 fibers with a 0.5 wt. % soap solution during 45 minutes at 50° according to ISO 105. There were no colour differences before and after the treatment of the fibers.

What is claimed is:

1. A process for incorporating an active substance in an object comprised partly or entirely of plastic which contains a dendrimer, said process comprising
   providing said object wherein said plastic contains a dendrimer with terminal groups that are compatible with the plastic; and
   bringing said object into contact with an active substance.
2. A process according to claim 1, wherein said dendrimer comprises a completely branched dendrimer, a dendrimer with defects in the branched structure, a dendrimer with an incomplete degree of branching or an asymmetrically branched dendrimer.
3. A process according to claim 1 or claim 2, wherein the dendrimer having terminal groups that are compatible with the plastic is obtained by modifying the terminal groups of a dendrimer with a compound to yield said modified terminal groups that are compatible with the plastic.
4. A process according to claim 3, wherein the modifying compound modifies the terminal groups with an alkyl group.
5. A process according to claim 4, wherein the alkyl group contains 6–50 C atoms.

6. A process according to claim 3, wherein at least 30% of the terminal groups have been reacted with the modifying compound.

7. A process according to claim 1 or 2, wherein a dendrimer of the 2nd up to and including the 5th generation is used.

8. A process according to claim 1, wherein polypropylene comprises the plastic of the object.

9. A process according to claim 1, wherein the object comprises fibres, and wherein said fibres are used as molded parts.

10. A process according to claim 8 or 9, wherein the plastic contains a polypropylene imine dendrimer.

11. A process according to claim 10, the dendrimer contains non-polar fatty acid end groups.

12. A molded plastic part to be used as the object in the process according to claim 3.

13. A molded plastic composition of the molded plastic part to be used as the object in the process according to claim 3.

14. A process according to claim 1, wherein said plastic comprises isotactic polypropylene, and said dendrimer comprises an amine-terminated polypropylene imine dendrimer, and a mixture of said plastic and said dendrimer was extruded to obtain fibers, and said fibers were contacted with an active substance whereby said fibers incorporated said active substance.

15. a process according to claim 1, wherein said active substance is a dye.

* * * * *